April 5, 1932.  J. G. SISSON  1,852,760
CYLINDER GAUGE
Filed Nov. 9, 1927   2 Sheets-Sheet 1
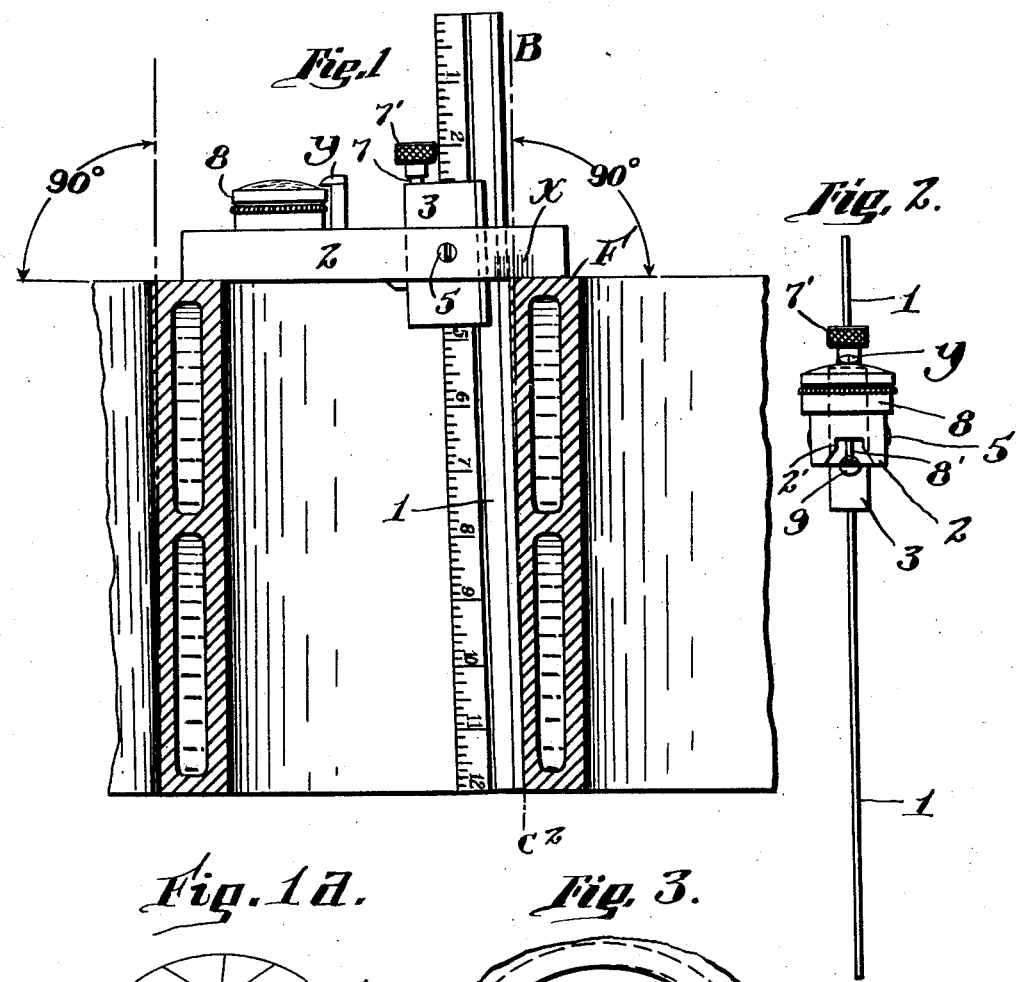
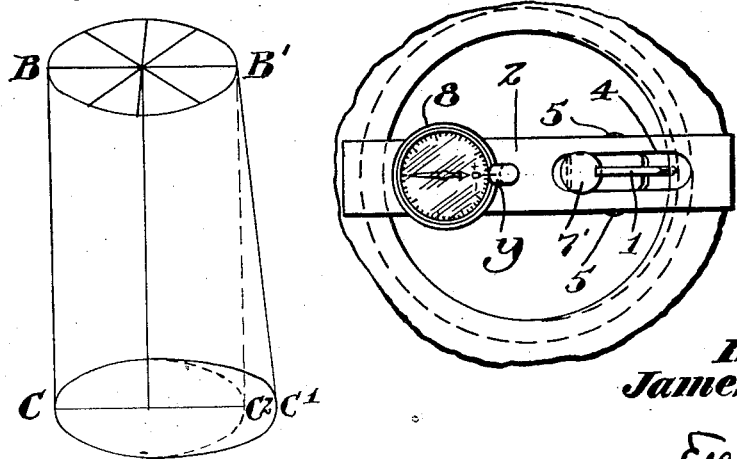
Inventor
James G. Sisson
By Ellis Spear Jr.
Attorney

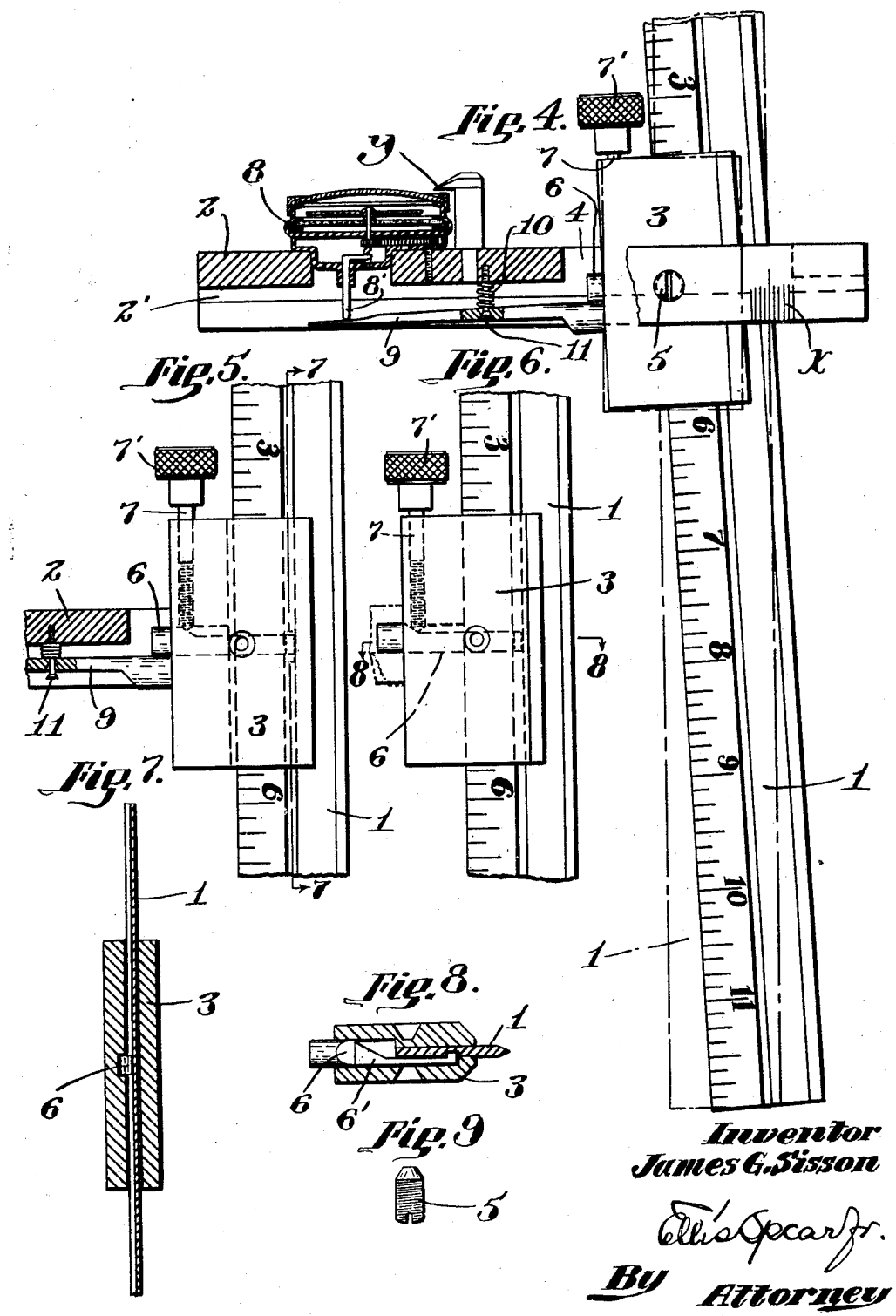

Patented Apr. 5, 1932

1,852,760

UNITED STATES PATENT OFFICE

JAMES G. SISSON, OF ATHOL, MASSACHUSETTS, ASSIGNOR TO THE L. S. STARRETT COMPANY, A CORPORATION OF MASSACHUSETTS, ORGANIZED IN 1929

CYLINDER GAUGE

Application filed November 9, 1927. Serial No. 232,183.

The observation and measurement of cylindrical bores as in the case of automobile cylinders where inaccuracies or wear are to be observed has become a matter of recognized importance. Internal gauges of various types are used in this work, but these are generally of point contact type, measuring or indicating distances between opposite points on the cylinder wall. The possibility of a better understanding of cylinder conditions have been suggested, but present available devices for obtaining this understanding seem to have been wanting.

According to the accepted standard in engine production the usual cylinder block is carefully faced and the cylinder bores finished in true perpendicularity to that face or conversely faced to the cylinder axes. However, even in production an axis may be inclined or if originally true may be worn to shift the axis as well as vary the cylindricity.

My present invention contemplates an instrument of novel type by which the wear or original imperfections of a bore or cylinder may be observed and measured in what is methodically a new way. Generally speaking, it may be said to contemplate the study of the figure of the wear or imperfection on a geometrical basis by which its relation to the top of the cylinder block or other parts of an organized machine may be observed for corrective diagnosis.

In the accompanying drawings I have shown as an illustrative embodiment a device for this purpose and in connection therewith have indicated somewhat diagrammatically the uses of such a device. Throughout the specification and drawings like reference characters are employed to indicate corresponding parts, and in the drawings:

Fig. 1 is a view of an instrument in accordance with my invention in position in a fragmentary cylinder block.

Fig. 1a a diagrammatic study of the principles involved in Fig. 1.

Fig. 2 a side view of my device removed.

Fig. 3 a plan view of the device in a cylinder.

Fig. 4 an enlarged side view of the device partly broken away.

Fig. 5 a detail of the blade block assembly.

Fig. 6 a somewhat similar view indicating the locking action.

Fig. 7 a section on the line 7—7, of Fig. 5.

Fig. 8 a section on the line 8—8, of Fig. 6, and

Fig. 9 a detail of a pivot screw.

In Fig. 1, I have indicated the instrument in position in what may be considered as a worn cylinder in which the blade is in contact with the cylinder wall in an area where the wall has been worn to a slightly conic figure. Its departure from cylindricity is indicated by the broken line $B—C^2$ which is parallel with the original cylinder axis and perpendicular to the upper face F of the cylinder block. In accordance with the usual practice, the face of the block is faced off in a true plane and the cylinders bored on axes perpendicular thereto.

The condition of this cylinder may be considered as diagrammatically indicated in Fig. 1a in which the diameter $B—B^1$ is the original diameter of the cylinder, while the line $C—C^1$ is the major axis of the lower end of the cylinder, the distance $C^2—C^1$ representing the difference between the original bore and the said major axis. This represents the major depth of the wear. It will be understood that the plane $B—B^1—C^1—C$ represents one of an infinite number of diametric planes through the cylinder axis. These give lineal intercepts similar to the line $B^1—C^1$ or the line $B—C$ or lines of intermediate disposition and form according to the character or figure of the wear.

In such a figure as shown in 1a, the wear is a conic section cut by a co-axial cylindrical intercept and is in form a tapered figure of crescent shape base tapering to a feathered edge. This, of course, is only one of great variety of figures of wear due to a great variety of causes and conditions, but it may be considered as sufficiently indicative of the principles involved.

In the position of the instrument as shown in Fig. 1, the straight edge of the blade 1 is shown as occupying the line $B^1$—$C^1$ as indicated in Fig. 1a. The face piece 2 of the instrument has its flat lower face on the line B—$B^1$ and supported on the flat top face F of the cylinder block. The blade 1 is clamped in a pivot block 3. This is pivotally supported in a slot 4 in the face piece 2 by pivot screws 5. In the block 3 the blade is clamped by a hooked member 6 having a beveled face $6^1$ against which the conic end of a screw 7 bears. The screw 7 has a knurled head $7^1$ and when screwed in draws the hooked member so as to clamp the blade 1 in the block 3 in any desired position.

The face piece 2 is further longitudinally undercut as at $2^1$ and carries a multiplying dial indicator 8 of the reciprocating contact type. Contact is indicated as at $8^1$ and is actuated by a lever 9 mounted in the undercut $2^1$ of the face piece 2 and fixed at one end in the block 3 to move with said block. The lever is normally held down by a spring 10 on a stop screw 11. This spring therefore tends to rock the blade 1 from its position shown in dotted lines in Fig. 4 to its position shown in full lines in that figure. The dotted line position is one in which it is at right angles to the face piece 2.

In utilizing this instrument it is placed in the cylinder bore with its flat lower face bearing on the face F of the cylinder block. It is positioned so that the blade 1 lies in one of the diametric planes of the cylinder axis and the face piece 2 is then pushed so as to bring the straight edge of the blade against the cylinder wall until it has established a definite bearing. In the case shown this bearing will be along the entire side of the cylinder and at a slight angle to the axis thereof as explained in connection with Fig. 1a. In case the wear has been in the lower regions of the cylinder the blade will establish contact only in the angular portion.

In order to assist in adjusting the face piece 2 so a to bring the blade 1 in the desired diametric plane, I may provide lateral markings as X on the two sides of the face piece by which the block may be set with reference to the upper end of the cylinder which is usually in true circle.

These markings serve another purpose which becomes evident in connection with such an instance as that before recited where the wear is below the top of the cylinder. In this case the upper end of the blade will stand in from the edge of the cylinder an amount proportional to the depth of that point below the top of the cylinder where the wear begins; that is to say, the point of angular departure of the wear. For example, if this point of departure was three inches below the upper end of the cylinder then for a given angle of departure the initial line 1 would be offset a certain number of graduations on the scale X from the edge of the cylinder at its upper end. In this way the graduations X not only serve the purpose of getting the face piece 2 in proper diametric position, but serve to indicate the depth of the point of departure so that the location as well as the figure of the wear is shown.

The indicator 8 has an adjustable dial so that it may be set at zero with reference to the pointer $y$. This is usually done with reference to the 90° angle of the blade 1 with the face piece 2 but it may also be used where the line of maximum wear has been determined and it is desirable to note the deviations therefrom of the indicator in successive planes.

In general testing, the instrument is usually applied to a cylinder at several points, say of 90° spacing. This would give the general form of the cylinder. If detailed study is desired of any wear that is localized, a mark may be made on the cylinder face and this wear studied on successive lines of intercept by simply swinging the device so that the edge of the blade sweeps the wall of the cylinder over its worn area.

Devices in accordance with my invention may be variously constructed and the device shown may be variously modified, all without departing from the spirit of my invention as defined in the claims which follow.

What I therefore claim and desire to secure by Letters Patent is:—

1. In a gauge of the class described, a face piece, a block pivoted thereon and having a slideway therein, a straight edge slidably mounted in said slideway, an indicator on said face piece, and means for operatively connecting said block and indicator to transmit the tilting movement of the straight edge.

2. In a gauge of the class described, a face piece, a block pivoted thereon and having a slideway therein, a straight edge slidably mounted in said slideway, a lock on the block for clamping the straight edge, an indicator on said face piece, and means for operatively connecting said block and indicator to transmit the tilting movement of the straight edge.

3. A device for testing cylinder bores in faced engine blocks, comprising a face piece spanning one end of a cylinder in planal coincidence with the cylinder block face, a block pivoted to said face piece, a straight edge carried by said block and presenting a depending portion functioning as a lineally contacting feeler adapted when introduced into the cylinder bore to contact with any portion of the cylinder wall which may be out of perpendicular with reference to the cylinder block face, a multiplying indicator, and operative connections from said indicator to said block for visually indicating rocking movements of said straight edge.

4. In a device of the class described, a face piece disposable at right angles to a cylinder axis, a block pivotally mounted thereon, a straight edge slidably supported in said block, a multiplying indicator on said face piece having a reciprocating contact and a lever connection between said block and contact.

5. In a gauge of the class described, a face piece, a block pivoted thereto, a feeler mounted on said block at one side thereof, an indicator mounted on said face piece to occupy a position thereover, said indicator having a depending contact, and a motion transmitting connection disposed beneath said face piece and between said block and said depending contact of the indicator.

6. In a gauge of the class described, a face piece having an undercut lower face and having a vertical slot adjacent one end, a block pivoted in said slot, a feeler carried by said block, an indicator mounted on the upper face of said face piece to occupy a position thereover, said indicator having a depending contact, and a motion transmitting connection mounted in the undercut lower face of said face piece and disposed between said block and said depending contact of the indicator.

7. In a gauge of the class described, a face piece, a feeler having a pivotal connection with said face piece, an indicator mounted on said face piece to occupy a position thereover, said indicator having a depending contact, and a motion transmitting connection disposed beneath said face piece and between said block and said depending contact of the indicator.

8. In a device of the class described, a face piece disposable at right angles to a cylinder axis, a block pivotally mounted thereon, a straight edge slidably supported in said block, a multiplying indicator on said face piece and having a contact, a lever engageable at one end with said contact and fixed at its other end within said block, and a spring active on said lever and normally tending to maintain said straight edge against the wall of the cylinder bore.

9. In a bore testing device, a face piece disposable at right angles to the axis of the bore to be tested and having its lower face longitudinally undercut to provide a recess, a block pivotally mounted on said face piece at one side thereof and disposed in a plane at substantially right angles thereto, a straight edge slidably mounted on said block and disposed for lineal contact with the wall of the bore to be tested, a manually operable clamp for locking said straight edge against movement relative to said block, a multiplying indicator mounted on the upper face of said face piece and having a contact projecting into said undercut recess, and a lever disposed in said undercut recess and engageable at one end with said indicator contact and at its other end with said block for transmitting the tilting motion of said straight edge to said indicator contact.

In testimony whereof I affix my signature.

JAMES G. SISSON.